Patented Dec. 11, 1945

2,390,575

UNITED STATES PATENT OFFICE 2,390,575

STABILIZED SOLUTIONS OF ERGOT ALKALOIDAL SALTS

Clair S. Dyas, Pearl River, N. Y., assignor to Lederle Laboratories, Inc., New York, N. Y., a corporation of Delaware No Drawing. Application May 1, 1944, Serial No. 533,665

7 Claims. (Cl. 167—67)

This invention relates to stable solutions of water-soluble, organic acid salts of ergot alkaloids and to a method of preparing the same.

The alkaloids of ergot have been known to possess oxytocic activity, and both the total alkaloids and certain specific ones found therein have been used at the time of parturition in both humans and animals. The proper dosage is important, as too little is of practically no value, and too much causes violent or prolonged contraction of the uterus, either of which is both undesirable and dangerous. Accordingly, the activity of the preparation must be determined and standardized in order that a proper therapeutic dosage of the drug can be administered.

It is also generally known that aqueous solutions of the various ergot alkaloidal salts tend to deteriorate, particularly when exposed to the action of light and oxygen. This deterioration is indicated by a gradual darkening of the solution and the formation of a precipitate. Attempts have been made to stabilize these preparations, but for some reason or another the salts of ergot alkaloids fail to respond to the usual anti-oxidant stabilizers. One method of avoiding the deterioration of the alkaloidal salts is to isolate them in crystalline form and seal the preparation in an atmosphere of nitrogen or carbon dioxide. When the seal is broken, the gas escapes; the remaining material then deteriorates and soon becomes of little value.

One of the objects of my invention is, therefore to prepare a solution of salts of ergot alkaloids which will retain practically its full therapeutic activity over a long period of time. It is a further object of my invention to obtain a stable aqueous ergot alkaloid preparation which can be stored for some time after its preparation and then used for oral or parenteral administration without the necessity of re-assaying the solution or otherwise treating it. Other objects of my invention will appear hereinafter.

In accordance with my invention I have discovered that aqueous solutions of salts of ergot alkaloids can be stabilized by the addition thereto of small amounts of thiourea. In general, such stable solutions of the ergot alkaloids may be prepared by extracting crude ergot with a fat solvent, treating the defatted ergot with an alkaline solution, then extracting the ergot alkaloids with a water-immiscible solvent and thereafter extracting the alkaloids from the solvent with an aqueous solution containing thiourea and having a pH of from about 2.0 to 6.0. While I do not wish to limit myself to any particular method of extracting the ergot alkaloids, I have found that a convenient method of doing so is as follows.

The crude ergot is finely ground, preferably to a particle size which will pass through a 20-mesh sieve. The finely-ground drug is extracted with petroleum benzin, gasoline, or similar fat solvent by a method of percolation until only a trace of oil remains in the percolate. The fat solvent may be recovered by distillation and re-used, while the oily residue is suitable for use in the manufacture of soap and its by-product, glycerin. After extraction of the oil, the drug is allowed to dry.

The dried drug is mixed with 10% ammonia water, using 50% by volume of the original weight of the drug. Solutions of other alkaline materials may be used in place of ammonia water in this step. While the drug may be mixed with the ammonia by any suitable means, I prefer to use a power mixer so that all portions of the drug are thoroughly moistened, thus assuring a complete extraction of the therapeutic alkaloids. The moist drug is transferred to bags and allowed to swell for about two hours, after which it is transferred to a suitable closed percolator and covered with purified benzene. While benzene is the solvent of choice, other water-immiscible solvents may be used, which include ethyl ether, chloroform, and the like.

The crude drug is allowed to remain in contact with the benzene for a period of from about 12 hours to about 18 hours, after which the benzene is drawn off. The benzene extract is agitated slowly for from about 3 hours to about 6 hours with a quantity of a solution (containing 1% of alpha-hydroxy isobutyric acid, ½% of thiourea, and distilled water to make 100%) equal to about ⅛ to about ¼ the volume of the benzene extract. In place of alpha-hydroxy isobutyric acid I may use other organic acids, such as acetic, succinic, lactic, tartaric, glutaric, glutamic, aspartic, etc. The use of inorganic acids is avoided since they frequently cause the precipitation of partially insoluble alkaloidal salts of the mineral acid. Preferably, the aqueous solution has a pH within the range 2 to 6 obtained by the use of weak organic acids. While the above represents the preferred proportions of thiourea and acid, in carrying out my invention I may use from about ½% to 3% of acid with from about ⅛% to 1% of thiourea.

The acid solution is separated from the water-immiscible solvent and subjected to vacuo without heat to remove the last traces of solvent. High temperatures and exposure to light and air should be avoided throughout the preparation.

The solvent is transferred back to the drug and enough new solvent added to cover it. The solvent-acid extraction is continued until the drug is exhausted. Each acid extraction is assayed, and those meeting the requirements are mixed, while the final extractions, being below standard, are set aside to be used on subsequent lots of drug in the place of new acid solution.

A bacteriostatic preservative, such as chlorbutanol (5 mgm. per cc.) is added to the assayed stable ergot alkaloid solution, and it is filtered and preserved in tightly closed amber bottles to protect it from light and air. Tests have shown that the ergot alkaloidal salt solutions prepared in accordance with my invention are stable and do not deteriorate noticeably upon storage for periods of several months.

While I have shown above that thiourea can be used to stabilize aqueous acidic extracts of salts of the total alkaloids of ergot, it is to be understood that thiourea may be used to stabilize the alkaloidal salts of any aqueous extract containing either some or all of the alkaloidal salts of ergot.

The use of thiourea is also advantageous in that it has been shown that small amounts of this substance may be injected into humans or animals without danger.

I claim:

1. A stable therapeutically active aqueous solution of ergot alkaloids which comprises water, water-soluble organic acid salts of the alkaloids of ergot, and thiourea.

2. A stable therapeutically active aqueous solution of ergot alkaloids which comprises water, water-soluble organic acid salts of the alkaloids of ergot, and thiourea, said solution having a pH of from about 2.0 to 6.0.

3. A stable therapeutically active aqueous solution of ergot alkaloids which comprises water, water-soluble alpha-hydroxy isobutyric acid salts of the alkaloids of ergot, and thiourea, said solution having a pH from about 2.0 to 6.0.

4. A stable therapeutically active aqueous solution of ergot alkaloids which comprises water, water-soluble glutaric acid salts of the alkaloids of ergot, and thiourea, said solution having a pH from about 2.0 to 6.0.

5. A stable therapeutically active aqueous solution of ergot alkaloids which comprises water, water-soluble organic acid salts of the alkaloids of ergot, $1/8\%$ to $1\%$ of thiourea, and $1/2\%$ to $3\%$ of alpha-hydroxy isobutyric acid.

6. In the process of producing a stable therapeutically active aqueous solution of ergot alkaloidal salts the step which comprises extracting a water-immiscible solution of ergot alkaloids with an aqueous solution having a pH of from about 2.0 to 6.0 containing thiourea and a weak organic acid.

7. In the process of producing a stable therapeutically active aqueous solution of ergot alkaloidal salts the step which comprises extracting a benzene ergot alkaloid solution with an aqueous solution containing $1/8\%$ to $1\%$ of thiourea and $1/2\%$ to $3\%$ of alpha-hydroxy isobutyric acid.

CLAIR S. DYAS.